United States Patent
Misra et al.

(10) Patent No.: US 10,739,435 B2
(45) Date of Patent: Aug. 11, 2020

(54) SYSTEM METHOD FOR ACOUSTIC SOURCE LOCALIZATION WITH AERIAL DRONES

(71) Applicant: TATA CONSULTANCY SERVICES LIMITED, Mumbai (IN)

(72) Inventors: Prasant Kumar Misra, Bangalore (IN); Achanna Anil Kumar, Bangalore (IN); Balamura Lidhar Purush Othaman, Bangalore (IN)

(73) Assignee: TATA CONSULTANCY SERVICES LIMITED, Mumai (IN)

( * ) Notice: Subject to any disclaimer, the term of this patent is extended or adjusted under 35 U.S.C. 154(b) by 340 days.

(21) Appl. No.: 15/937,597

(22) Filed: Mar. 27, 2018

(65) Prior Publication Data
US 2019/0033422 A1    Jan. 31, 2019

(30) Foreign Application Priority Data
Jul. 28, 2017   (IN) .............................. 201721026912

(51) Int. Cl.
*G01S 3/805* (2006.01)
*B64C 39/02* (2006.01)
(Continued)

(52) U.S. Cl.
CPC .......... *G01S 3/8055* (2013.01); *B64C 39/024* (2013.01); *G01S 5/18* (2013.01);
(Continued)

(58) Field of Classification Search
CPC . G01S 3/8055; G01S 5/20; G01S 5/18; B64C 39/024; H04R 1/00; H04R 2430/23
See application file for complete search history.

(56) References Cited

U.S. PATENT DOCUMENTS 6,424,596 B1 * 7/2002 Donald .................... G01S 3/86
                                                              367/124
7,551,519 B2    6/2009 Slater
(Continued)

FOREIGN PATENT DOCUMENTS

EP              3435110 A1 *  1/2019  ........... B64C 39/024

OTHER PUBLICATIONS

Jean-Marcvalin, François Michaud, Bjeanrouat, "Robust Localization and Tracking of Simultaneous Moving Sound Sources Using Beamforming and Particle Filtering" Robotics and Autonomous Systems Dated 31 Mar. 20, pp. 216-28, vol. 55, Issue 3, publisher Elsevier Ltd. Link: https://arxiv.org/pdf/1602.08139.pdf.

*Primary Examiner* — Daniel Pihulic
(74) *Attorney, Agent, or Firm* — Finnegan, Henderson, Farabow, Garrett & Dunner LLP (57) ABSTRACT

Detecting sound sources in a physical space-of-interest is challenging due to strong ego-noise from micro aerial vehicles (MAVs)' propeller units, which is both wideband and non-stationary. The present subject matter discloses a system and method for acoustic source localization with aerial drones. In an embodiment, a wideband acoustic signal is received from an aerial drone. Further, the wideband acoustic signal is splitted into multiple narrow sub-bands having cells. Moreover, from a measurement position corresponding to each of the multiple narrow sub-bands, power in each of the cells is measured by forming a beam to each of the cells. In addition, intra-band and inter measurement fusion of the measured power at each of the cells is performed. Also, geo-location of an acoustic source corresponding to the wideband acoustic signal is identified upon performing intra-band and inter measurement fusion of the measured power.

11 Claims, 5 Drawing Sheets

(51) Int. Cl.
*H04R 1/00* (2006.01)
*G01S 5/18* (2006.01)
*G01S 5/20* (2006.01)

(52) U.S. Cl.
CPC ............... *G01S 5/20* (2013.01); *H04R 1/00* (2013.01); *H04R 2430/23* (2013.01)

(56) References Cited

U.S. PATENT DOCUMENTS

| | | |
|---|---|---|
| 9,571,180 B2 | 2/2017 | Jalali et al. |
| 2016/0063987 A1 | 3/2016 | Xu et al. |
| 2019/0033422 A1* | 1/2019 | Misra ................. H04R 1/00 |

* cited by examiner

SYSTEM METHOD FOR ACOUSTIC SOURCE LOCALIZATION WITH AERIAL DRONES

PRIORITY CLAIM

The present application claims priority to Indian Patent Application No. 201721026912, filed on Jul. 28, 2017, the entirety of which is hereby incorporated by reference.

TECHNICAL FIELD

The embodiments herein generally relate to source localization, and, more particularly, to system and method for acoustic source localization with aerial drones.

BACKGROUND

Aerial drones, especially the micro, multi-rotor class with hovering capability, are fast emerging as a powerful new class of mobile sensing systems with a rich sensory gamut neatly combined with on-board communication and computing elements, and mobile agility regardless of the terrain and space (indoor/outdoor) constraints. They, also referred to as micro aerial vehicles (MAVs) are increasingly finding their usage across a wide range of applications ranging from industrial (e.g., infrastructure inspection of near-inaccessible areas such as civil structure or machinery/asset at high elevation, utility pipeline or overhead cable inspection over very long distances, etc.,) to humanitarian (e.g., search and rescue, emergency response, etc.,) sectors.

Vision is the most prominent mode of sensing in MAVs. Compared to other spatially rich sensors such as sonar and laser range finders (that are commonly used in terrestrial vehicles), vision sensors require comparatively lower energy to interrogate the environment and for a comparable mass, they can gather richer information and span wider fields of view. However, the MAVs become unusable in camera obstructed, occluded, low-light conditions, or in scenarios that offer profound non-visual clues (such as auditory acoustics).

SUMMARY

Embodiments of the present disclosure present technological improvements as solutions to one or more of the above-mentioned technical problems recognized by the inventors in conventional systems. In view of the foregoing, embodiments herein provides a technique for acoustic source localization with aerial drones.

In one embodiment, a processor-implemented method includes steps of: receiving, by one or more hardware processors, a wideband acoustic signal from an aerial drone; splitting, by the one or more hardware processors, the wideband acoustic signal into multiple narrow sub-bands having cells; from a measurement position corresponding to each of the multiple narrow sub-bands, measuring, by the one or more hardware processors, power in each of the cells by forming a beam at each of the cells; performing, by the one or more hardware processors, intra-band and inter measurement fusion of the measured power at each of the cells; and identifying, by the one or more hardware processors, geo-location of an acoustic source corresponding to the wideband acoustic signal upon performing intra-band and inter measurement fusion of the measured power.

In another embodiment, a system for acoustic source localization with aerial drones is provided. The system includes an aerial drone to receive a wideband acoustic signal from a source. Further, the system includes a global control unit communicatively coupled to the aerial drone. In an embodiment, the global control unit includes one or more memories; and one or more hardware processors, the one or more memories coupled to the one or more hardware processors wherein the one or more hardware processors are configured to execute programmed instructions stored in the one or more memories to: receive the wideband acoustic signal from the aerial drone; split the wideband acoustic signal into multiple narrow sub-bands having cells; from a measurement position corresponding to each of the multiple narrow sub-bands, measure power in each of the cells by forming a beam at each of the cells; perform intra-band and inter measurement fusion of the measured power at each of the cells; and identify geo-location of an acoustic source corresponding to the wideband acoustic signal upon performing intra-band and inter measurement fusion of the measured power.

In yet another embodiment, a non-transitory computer-readable medium having embodied thereon a computer program for executing a method for acoustic source localization with aerial drones is provided. The method includes the steps of: receiving, by one or more hardware processors, a wideband acoustic signal from an aerial drone; splitting, by the one or more hardware processors, the wideband acoustic signal into multiple narrow sub-bands having cells; from a measurement position corresponding to each of the multiple narrow sub-bands, measuring, by the one or more hardware processors, power in each of the cells by forming a beam at each of the cells; performing, by the one or more hardware processors, intra-band and inter measurement fusion of the measured power at each of the cells; and identifying, by the one or more hardware processors, geo-location of an acoustic source corresponding to the wideband acoustic signal upon performing intra-band and inter measurement fusion of the measured power.

It should be appreciated by those skilled in the art that any block diagram herein represents conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A robust acoustic localization technique for detecting sound sources in a physical space-of-interest is disclosed. Devising this capability is extremely challenging due to strong ego-noise from micro aerial vehicles (MAVs)' propeller units, which is both wideband and non-stationary. The present subject matter discloses a system for geo-locating sound sources in the presence of strong, wideband, non-stationary ego-noise of the mobile platform. It combines the benefits of sparse (two elements) sensor array design (for meeting the platform constraints), and mobility induced beam forming based on intra-band and inter-measurement beam fusion (for overcoming the severe ego-noise and its other complex characteristics) to significantly enhance the received signal-to-noise ratio (SNR). It provides a signal to noise ration (SNR) improvement of 15 to 18 dB compared to many conventional and widely used known methods. This SNR gain translates to a location accuracy of approximately 40 cm within a scan region of 6 m×3 m.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for acoustic source localization with aerial drones, has been explained in details with respect to the FIGS. 1 through 5. While aspects of described methods and systems for acoustic source localization with aerial drones can be implemented in any number of different systems, utility environments, and/or configurations, the embodiments are described in the context of the following exemplary system(s).

Figure 1:
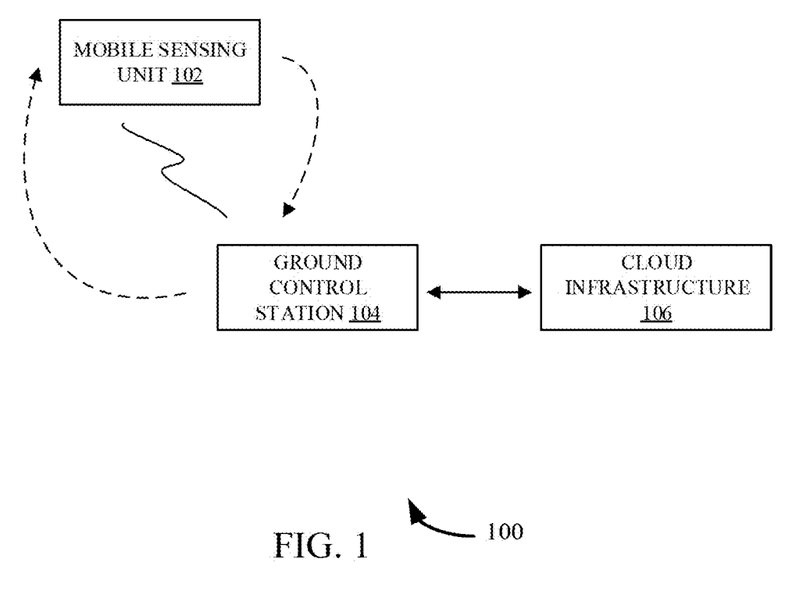
FIG. 1 illustrates a block diagram of a system for acoustic source localization with aerial drones, in accordance with some embodiments of the present disclosure.

FIG. 1 illustrates a block diagram of a system 100 for acoustic source localization with aerial drones, in accordance with some embodiments of the present disclosure. As shown in FIG. 1, the system 100 is composed of three units, such as an aerial drone (i.e., a mobile sensing unit 102), a ground control station (GCS) 104, and a cloud infrastructure 106. For example, the mobile sensing unit 102 includes a MAV with a wide range of on-board sensors, of which the optical and acoustic cameras are primarily used for external sensing, while other sensors (such as the accelerometer, gyroscope, compass, GPS and altimeter) are used for mission planning and operational maintenance of the unit 102. The unit 102 senses physical space, gathers and transfers back raw data to the GCS 104.

For example, an acoustic camera is a microphone array arranged in a particular geometrical pattern, and is used to determine the location of the sound source. Each element of the array is essentially a sensor for receiving the source signal, and its spatial arrangement enables the array to not only sample the wave field in time but also in space. The individual signals from each of the array elements are efficiently combined for the purpose of beam forming (or space-time processing). The final array response is a beam pattern that has high directivity in a given direction, thereby enabling the isolation, enhancement, suppression or rejection of the acquired signal from certain positions. It also measures the direction-of-arrival (DOA) of the source by correlating the received signal across the different microphone channels. Thus, the beam pattern of an array is the key element that determines its performance. For example, the beam pattern is composed of a main lobe that corresponds to a steering direction and smaller secondary side lobes. The ability to resolve sound sources is determined by the width of the main lobe, and its dynamic range is provided by the difference of power levels between the main and side lobes. While side lobes may appear irrelevant, they are a critical measure of the array sensitivity outside the steering direction. The preferred beam pattern is the one that suppresses the magnitude of the side lobes, while at the same time maximizes the directivity and resolution of the main lobe with the narrowest beam. The main lobe width and side lobe level are usually at odds with each other. It is observed that lowering the side lobes leads to an increase in the width of the main lobe, and finding an optimal beam pattern involves a compromise between the two ends. The array beam pattern is determined by its geometry. The main lobe width is inversely proportional to the aperture length A and inter-element spacing B. In order to strike a good balance between array efficiency and the platform constraints of minimal payload and operation overhead, a sparse array design of large aperture is chosen. For example, a sparse array design with only two sensing elements separated by a distance of 23 cm (i.e., $7\lambda/2$) is chosen.

In an example implementation, AR.Drone 2:0 quadcopter is used as the mobile sensing unit 102. As the name quadcopter implies, this aircraft consists of four propellers units situated in the same horizontal plane located around its body. They provide lift, stability and directional control, and lateral movement to allow the aircraft to propel itself forward in any direction. Each propeller unit consists of a 10 cm long blade mounted on a 15 W/28500 revolutions/minute (rpm) brushless motor.

Further, the GCS 104 is a standard computer that communicates with the mobile sensing unit 102 using a long-range radio. The GCS 104 allows the pilot to configure mission parameters. The GCS 104 also performs a first-level processing of the sensed data to signal back necessary indicators to the mobile sensing unit 102, as well as acts as an interface to transfer data sent by the mobile sensing unit 102 to the cloud infrastructure 106. The cloud infrastructure 106 is a unit where raw data and low-level inferences are permanently stored, curated, processed and fused with archival data for more fine-grained insights.

In operation, the GCS 104 receives a wide band signal associated with an acoustic source from the mobile sensing unit 102 and divides the signal (i.e., a search space) into a grid of a predefined cell size. The GCS 104 then uses natural mobility of the MAV to beam power to each cell at different measurement locations and at finer frequency resolutions. Subsequently, the GCS 104 consolidates all the beamed power to estimate the source location. This is explained in more detailed with reference to FIG. 2.

Figure 2:
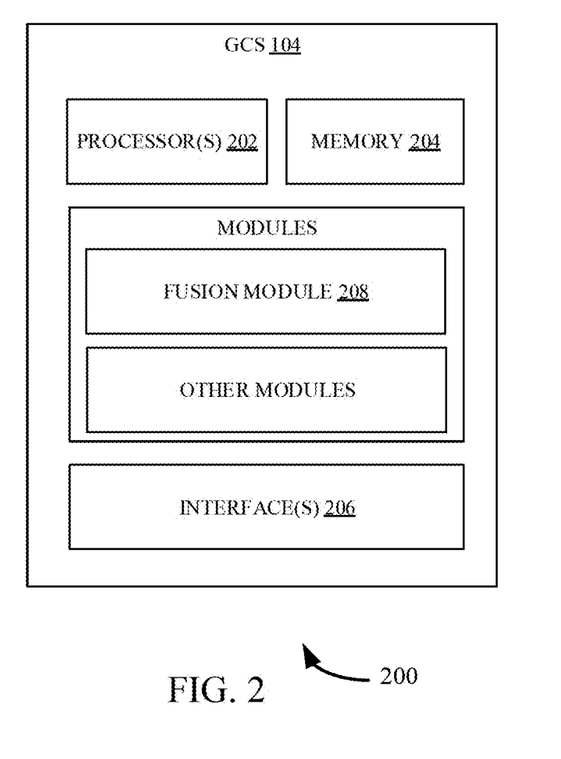
FIG. 2 illustrates a block diagram of a ground station controller shown in FIG. 1, in accordance with some embodiments of the present disclosure.

FIG. 2 illustrates a block diagram of the GCS 104, shown in FIG. 1, in accordance with some embodiments of the present disclosure. In an example embodiment, the GCS 104 may be embodied in, or is in direct communication with a computing device. The GCS 104 includes or is otherwise in communication with one or more hardware processors such as processor(s) 202, one or more memories such as a memory 204, and a network interface unit such as a network interface unit 206. In an embodiment, the processor 202, memory 204, and the network interface unit 206 may be coupled by a system bus such as a system bus or a similar mechanism. Although FIG. 2 shows example components of the system 200, in other implementations, the system 200 may contain fewer components, additional components, different components, or differently arranged components than depicted in FIG. 2.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 206 may include a variety of software and hardware interfaces, for example, interfaces for peripheral device(s), such as a keyboard, a mouse, an external memory, and a printer. The interface(s) 206 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 204, may store any number of pieces of information, and data, used by the system to implement the functions of the system. The memory 204 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system to behave in a manner as described in various embodiments. The memory 204 includes a fusion module 208 and other modules. The module 208 and other modules include routines, programs, objects, components, data structures, etc., which perform particular tasks or implement particular abstract data types. The other modules may include programs or coded instructions that supplement applications and functions of the system 200.

In operation, the fusion module 208 receives a wideband acoustic signal from the aerial drone 102. In an example implementation, a uniform linear array (ULA) comprising of M channels indexed by m={1, 2 . . . M} and equally spaced on a line with an inter-element distance of B is considered. It is mounted on the MAV, and receives signals radiated by Q wideband stationary sound sources. The sources are located in the far field. For example, D×1 position of the $q^{th}$ transmitter is denoted as $p_q$. Since ULA can only resolve sources in 2D, D=2 in this example. The MAV is supposed to take measurements at the $l^{th}$ position for a total of L different locations, where l={1, 2 . . . L}. The complex signal envelope observed by the $m^{th}$ sensor element at the $l^{th}$ position is expressed as:

$$r_{m,l}(t) = \sum_{q=1}^{Q} e^{j2\tau_{m,l}(p_q)} s_{q,l}(t - \tau_{m,l}(p_q)) + \eta_{m,l}(t) \quad (1)$$

Where ηm,l (t) denotes the additive white noise and τm,l ($p_q$) represents the delay of the $m^{th}$ sensor with respect to a reference sensor for the transmitter located at $p_q$.

Further the fusion module 208 splits the wideband acoustic signal into multiple narrow sub-bands having cells. For wideband processing, the signal received at each channel is decomposed into smaller sub-bands using a filter bank comprising of $N_S$ non-overlapping filters. Using equation 1 and a standard narrowband signal, the signal observed at the $i^{th}$ measurement position corresponding to the $i^{th}$ sub-band can be expressed as:

$$r_l^{(i)}(t) = \sum_{q=1}^{Q} a_l^{(i)}(p_q) s_q^{(i)}(t) + \eta_l^{(i)}(t) \quad (2)$$

where $N_S$ denotes the number of sub-bands (and therefore, the number of filters) and is indexed with $i=\{1, 2, \ldots, N_S\}$, $s_q^{(i)}(t)$ represents the $i^{th}$ sub-band of the $q^{th}$ source, $a_l^{(i)}(p_q)$ denotes the array response at the $l^{th}$ measurement location for the $i^{th}$ sub-band for the signal source located at $p_q$ and $r_l^i(t)$ is a M×1 vector. The equivalent expression of equation 2 in matrix form is:

$$r_l^{(i)}(t) = A_l^{(i)} s^{(i)}(t) + \eta_l^{(i)}(t) \quad (3)$$

Where $A_l^{(i)} = [a^{(i)}(p_1), \ldots, a_l^{(i)}(p_Q)]$ and $s^{(i)} = [s_1^{(i)}, \ldots, s_Q^{(i)}]^T$.

Further, the ULA supported beam former given by equation (3) is subject to spatial aliasing at higher frequency sub-bands. In sparse representation framework, the locations of the smaller cells in the scan region are denoted by $\tilde{P} = \{\tilde{p}_1, \tilde{p}_2, \ldots, \tilde{p}_{N_p}\}$, where $N_p$ denotes the number of smaller cells and $N_p \gg Q$. Assuming $P \subset \tilde{P}$, equation (3) can be expressed as:

$$r_l^{(i)}(t) = \tilde{A}_l^{(i)} \tilde{s}^{(i)}(t) + \eta_l^{(i)}(t) \quad (4)$$

Where $\tilde{A}_l^{(i)} = [a_l^{(i)}(\tilde{p}_1), a_l^{(i)}(\tilde{p}_2), \ldots, a_l^{(i)}(\tilde{p}_{N_p})]$ and is of size M×$N_p$. In this representation, the $k^{th}$ row of the sparse vector is non-zero and is equal to $s_k^{(i)}(t)$ if a source signal is present at location $p_k$. Also, the equation (4) is for the measurement at one single location I and one sub-band i.

From a measurement position corresponding to each of the multiple narrow sub-bands, the fusion module 208 the measures power in each of the cells by forming a beam to each of the cells. Furthermore, the fusion module 208 performs intra-band and inter measurement fusion of the measured power at each of the cells. In an embodiment, the fusion module 208 fuses the measured power of each of the cells at a measurement position across the multiple narrow sub-bands. In an example implementation, the fusion module 208 fuses the measured power of each of the cells at the measurement position having a common look-ahead direction across the all narrow sub-bands. The fusion module 208 then fuses the measured power of each of the cells across the measurement positions upon fusing the measured power of each of the cells at the measurement position across the multiple narrow sub-bands. In other words, the power in each of the cells is determined by beam forming and appropriately fusing the individual power measurements in a manner such that the power in the respective cell where the target signal is present is boosted up compared to other empty cells. In an example, the combined intra-band and inter-measurement fused power for a cell located at $\tilde{P}_k$ is estimated using the following expression:

$$W_{\tilde{p}_k} = \sum_{l=1}^{L} \prod_{i=1}^{N_T} (\Omega_l^{(i)})^H r_l^{(i)}(t) \quad (5)$$

where the weighting vector ($\Omega_l^{(i)}$) is computed using a beam former (e.g., Capon's beam former) given by:

$$\Omega_l^{(i)} = \frac{(R_l^{(i)})^{-1}(a_l^{(i)}(\tilde{p}_k))}{(a_l^{(i)}(\tilde{p}_k))^H (R_l^{(i)})^{-1}(a_l^{(i)}(\tilde{p}_k))}$$

Figure 3A:
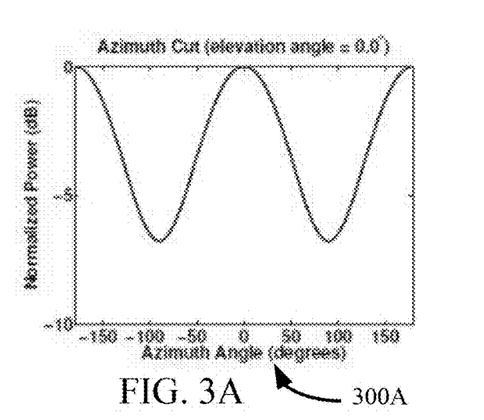
FIGS. 3A-3C illustrate rationale of intra-band beam fusion, in accordance with some embodiments of the present disclosure.
Figure 3B:
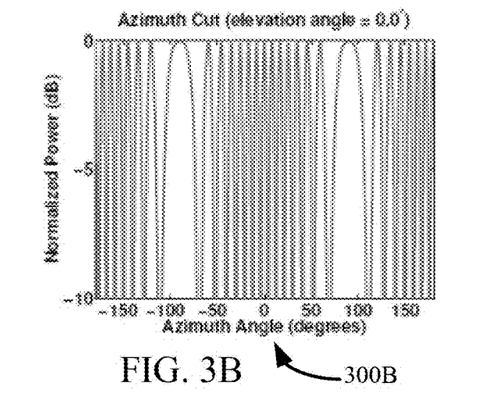
Figure 3C:
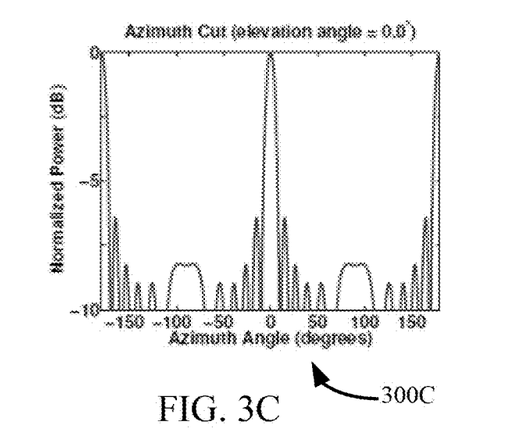

In this embodiment, the beam corresponding to lower sub-bands (i.e., lower frequencies) yield a single beam but of wider width (beams corresponding to 500 Hz (single beam at 0°, but of wider width) is shown in a graph 300A of FIG. 3A) while the beam corresponding to higher sub-bands (i.e., higher frequencies) yields a narrower beam, but consists of undesirable grating lobes (beams corresponding to 5 kHz (a narrow beam, but with grating lobes at 180° that spreads into −90° and +90° is shown in a graph 300B of FIG. 3B). By fusing the beams of all sub-bands (performing the Π operation of the equation 5), a relatively narrow beam is obtained and significant reduction is obtained in grating lobes levels (as shown in a graph 300C of FIG. 3C). Thereafter, the inter-measurement fusion across all measurement location is performed by the Σ operation of the equation 5. The power in that corresponding cell where the actual sound source is located eventually increases (as a result of this aggregation) than the beam forming power corresponding to individual measurement location, with significant reduction in the power levels of the unwanted grating lobes and noisy peaks. Thus, it not only overcomes spatial aliasing, but also improves the performance in estimating the location of the sound source(s) in a processing step.

Figure 4A:
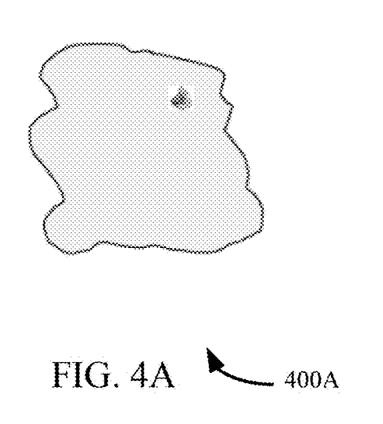
FIGS. 4A-4D are graphs illustrating an original location of a sound source, in accordance with some embodiments of the present disclosure.
Figure 4B:
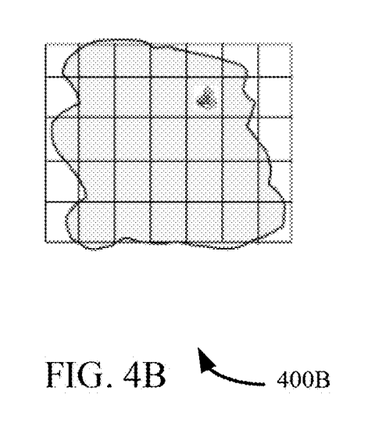
Figure 4C:
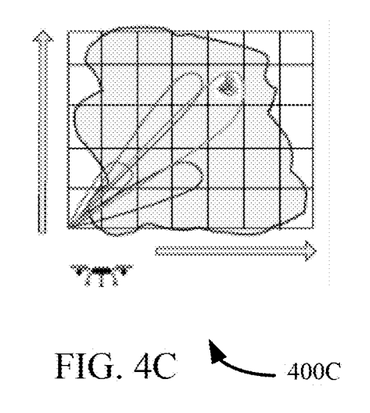
Figure 4D:
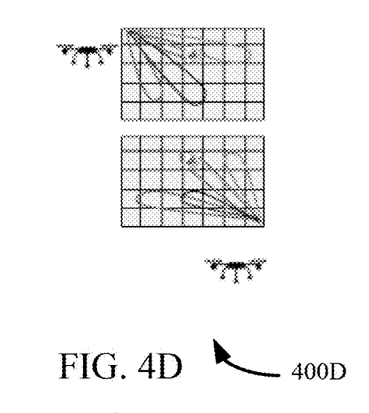
Figure 4E:
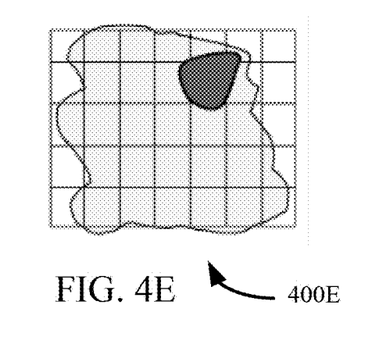
FIG. 4E is a graph illustrating an estimated location of the sound source, in accordance with some embodiments of the present disclosure.

In addition, the fusion module 208 identifies geo-location of an acoustic source corresponding to the wideband acoustic signal upon performing intra-band and inter measurement fusion of the measured power. For example, the module 208 identifies one of the cells having maximum power is identified as the geo-location of the acoustic source. For example, a speaker symbol in graphs 400A-D of FIGS. 4A-D denotes an original location of a sound source and a red blob in a graph 400E of FIG. 4E represents its estimated location.

Figure 5:
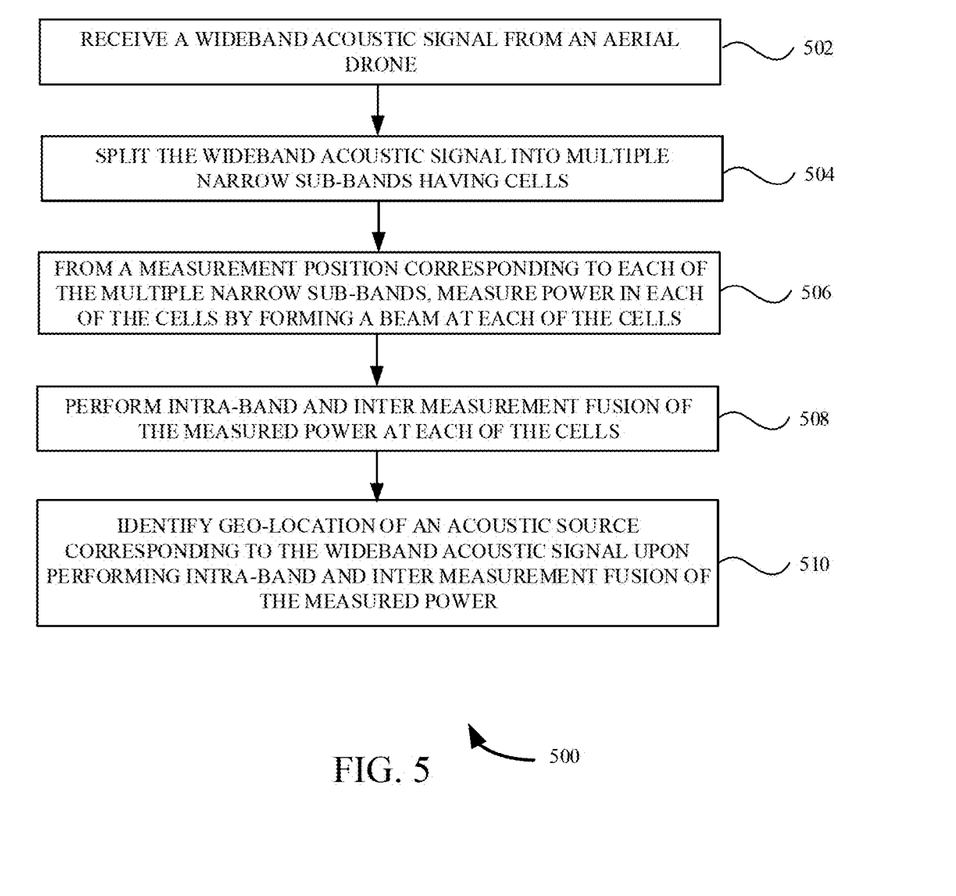
FIG. 5 illustrates a flow diagram of a method for acoustic source localization with aerial drones, in accordance with some embodiments of the present disclosure.

FIG. 5 illustrates a flow diagram of a method 500 for acoustic source localization with aerial drones, in accordance with some embodiments of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof. In an embodiment, the method 500 depicted in the flow chart may be executed by a system, for example, the system 100 of FIG. 1.

At block 502, a wideband acoustic signal is received from an aerial drone. At block 504, the wideband acoustic signal is splitted into multiple narrow sub-bands having cells. In an embodiment, the wideband acoustic signal is splitted into the multiple narrow sub-bands using N-channel filter bank. At block 506, form a measurement position corresponding to each of the multiple narrow sub-bands, power in each of the cells is measured by forming a beam to each of the cells.

At block 508, intra-band and inter measurement fusion of the measured power is performed at each of the cells. In an example implementation, the measured power of each of the cells is fused at a measurement position across the multiple narrow sub-bands. In an example, the measured power of each of the cells is fused at the measurement position having a common look-ahead direction across the multiple narrow sub-bands. Further, the measured power of each of the cells is fused across the measurement positions upon fusing the measured power of each of the cells at the measurement position across the multiple narrow sub-bands.

At block 510, geo-location of an acoustic source corresponding to the wideband acoustic signal is identified upon performing intra-band and inter measurement fusion of the measured power. In an example implementation, one of the cells having maximum power is identified upon performing intra-band and inter measurement fusion of the measured power as the geo-location of the acoustic source.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such non-transitory computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
receiving, by one or more hardware processors, a wideband acoustic signal from an aerial drone;
splitting, by the one or more hardware processors, the wideband acoustic signal into multiple narrow sub-bands having cells;
from a measurement position corresponding to each of the multiple narrow sub-bands, measuring, by the one or more hardware processors, power in each of the cells by forming a beam to each of the cells;
performing, by the one or more hardware processors, intra-band and inter measurement fusion of the measured power at each of the cells; and
identifying, by the one or more hardware processors, geo-location of an acoustic source corresponding to the wideband acoustic signal upon performing intra-band and inter measurement fusion of the measured power.

2. The method of claim 1, wherein splitting the wideband acoustic signal into multiple narrow sub-bands, comprises:
splitting the wideband acoustic signal into the multiple narrow sub-bands using N-channel filter bank.

3. The method of claim 1, wherein performing intra-band and inter measurement fusion of the measured power at each of the cells, comprises:
fusing the measured power of each of the cells at a measurement position across the multiple narrow sub-bands; and
fusing the measured power of each of the cells across the measurement positions upon fusing the measured power of each of the cells at the measurement position across the multiple narrow sub-bands.

4. The method of claim 3, wherein fusing the measured power of each of the cells at the measurement position across the multiple narrow sub-bands, comprises:
fusing the measured power of each of the cells at the measurement position having a common look-ahead direction across the multiple narrow sub-bands.

5. The method of claim 1, wherein identifying geo-location of the acoustic source corresponding to the wideband acoustic signal upon performing intra-band and inter measurement fusion of the measured power, comprises:

identifying one of the cells having maximum power upon performing intra-band and inter measurement fusion of the measured power as the geo-location of the acoustic source.

6. A system comprising:

an aerial drone, wherein the aerial drone captures a wideband acoustic signal from a source; and a ground control unit communicatively coupled to the aerial drone; wherein the ground control unit comprises:

one or more memories; and one or more hardware processors, the one or more memories coupled to the one or more hardware processors, wherein the one or more hardware processors are configured to execute programmed instructions stored in the one or more memories to:

receive the wideband acoustic signal from the aerial drone;

split the wideband acoustic signal into multiple narrow sub-bands having cells;

from a measurement position corresponding to each of the multiple narrow sub-bands, measure power in each of the cells by forming a beam at each of the cells;

perform intra-band and inter measurement fusion of the measured power at each of the cells; and identify geo-location of an acoustic source corresponding to the wideband acoustic signal upon performing intra-band and inter measurement fusion of the measured power.

7. The system of claim 6, wherein the one or more hardware processors are further capable of executing programmed instructions to:

split the wideband acoustic signal into the multiple narrow sub-bands using N-channel filter bank.

8. The system of claim 6, wherein the one or more hardware processors are further capable of executing programmed instructions to:

fuse the measured power of each of the cells at a measurement position across the multiple narrow sub-bands; and fuse the measured power of each of the cells across the measurement positions upon fusing the measured power of each of the cells at the measurement position across the multiple narrow sub-bands.

9. The system of claim 8, wherein the one or more hardware processors are further capable of executing programmed instructions to:

fuse the measured power of each of the cells at the measurement position having a common look-ahead direction across the multiple narrow sub-bands.

10. The system of claim 6, wherein the one or more hardware processors are further capable of executing programmed instructions to:

identifying one of the cells having maximum power upon performing intra-band and inter measurement fusion of the measured power as the geo-location of the acoustic source.

11. A non-transitory computer readable medium embodying a program executable in a computing device, the program comprising:

a program code for receiving a wideband acoustic signal from an aerial drone;

a program code for splitting the wideband acoustic signal into multiple narrow sub-bands having cells;

a program code for, from a measurement position corresponding to each of the multiple narrow sub-bands, measuring power in each of the cells by forming a beam to each of the cells;

a program code for performing intra-band and inter measurement fusion of the measured power at each of the cells; and a program code for identifying geo-location of an acoustic source corresponding to the wideband acoustic signal upon performing intra-band and inter measurement fusion of the measured power.

* * * * *